(12) United States Patent
Kisaichi et al.

(10) Patent No.: US 12,455,001 B2
(45) Date of Patent: Oct. 28, 2025

(54) CRANK CASE STRUCTURE

(71) Applicant: HONDA MOTOR CO., LTD., Tokyo (JP)

(72) Inventors: Toru Kisaichi, Tokyo (JP); Hirokazu Tanaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/616,197

(22) Filed: Mar. 26, 2024

(65) Prior Publication Data

US 2024/0328501 A1 Oct. 3, 2024

(30) Foreign Application Priority Data

Mar. 28, 2023 (JP) ................. 2023-051509

(51) Int. Cl.
*F16H 57/031* (2012.01)
*F16H 57/02* (2012.01)

(52) U.S. Cl.
CPC ..... *F16H 57/031* (2013.01); *F16H 2057/0203* (2013.01); *F16H 2057/02065* (2013.01)

(58) Field of Classification Search
CPC ........... F16H 57/031; F16H 2057/0203; F16H 2057/02065
See application file for complete search history.

(56) References Cited

U.S. PATENT DOCUMENTS

| | | | | |
|---|---|---|---|---|
| 4,518,070 A | * | 5/1985 | Ooka | F16H 57/029 192/85.5 |
| 4,566,577 A | * | 1/1986 | Tsuboi | F16D 25/086 192/85.5 |
| 8,662,253 B2 | * | 3/2014 | Terada | F16H 57/043 184/6.5 |
| 9,249,842 B2 | * | 2/2016 | Mukouhara | F16D 25/086 |
| 11,543,018 B2 | * | 1/2023 | Kisaichi | F16H 57/0423 |
| 2006/0293104 A1 | | 12/2006 | Watanabe | |
| 2018/0087417 A1 | | 3/2018 | Okada et al. | |

FOREIGN PATENT DOCUMENTS

| | | |
|---|---|---|
| JP | 2006077651 A | 3/2006 |
| JP | 2007009737 A | 1/2007 |
| JP | 2011074799 A | 4/2011 |
| JP | 2015068431 A | 4/2015 |
| JP | 2018053757 A | 4/2018 |
| WO | 2013111152 A1 | 8/2013 |

OTHER PUBLICATIONS

Notification of Reasons for Refusal issued Feb. 4, 2025 in the JP Patent Application No. 2023-051509.

* cited by examiner

*Primary Examiner* — Thomas C Diaz
(74) *Attorney, Agent, or Firm* — CKC & Partners Co., LLC

(57) ABSTRACT

A crank case structure that can reduce a front-rear dimension of the crank case to reduce the size of a power unit. A crank case structure adapted to a crank case (9) that houses a crankshaft (C) of a power unit (P), including a crank case cover (20) attached to a side surface of the crank case (9), a push rod (31) that is disposed parallel to the crankshaft (C) and reciprocates to disengage a clutch (CL), and a clutch drive unit (30) that reciprocates the push rod (31). A through hole (32), through which the push rod (31) passes, is formed within an area of a sealing surface (29), the sealing surface (29) is formed in the crank case (9) to attach to the crank case cover (20), and the clutch drive unit (30) is attached to the crank case cover (20).

5 Claims, 9 Drawing Sheets

CRANK CASE STRUCTURE

This application is based on and claims the benefit of priority from Japanese Patent Application No. 2023-051509, filed on 28 Mar. 2023, the content of which is incorporated herein by reference.

BACKGROUND OF THE INVENTION

Field of the Invention

The present invention relates to a crank case structure, and more particularly, to a crank case structure adapted to a crank case that houses a crankshaft.

Related Art

In a power unit in which an engine and a transmission are integrated, a crank case cover that covers a generator or the like is attached to a side surface of a crank case that houses a crankshaft.

Patent Document 1 discloses a configuration in which a crank case cover that covers a generator is attached to a side surface on a left side in a vehicle width direction of a crank case and in which a clutch drive unit that operates to disengage a clutch is attached to a position rearward of the crank case cover.

Patent Document 1: Japanese Unexamined Patent Application, Publication No. 2015-68431

SUMMARY OF THE INVENTION

Because the crank case structure of Patent Document 1 has a layout in which the crank case cover and the clutch drive unit are arranged in a front-rear direction, a front-rear dimension of the crank case tends to be larger, and there is still room for improvement for further reduction in size of the power unit.

It is an object of the present invention to solve the above-mentioned problems of the prior art and provide a crank case structure that can reduce a front-rear dimension of the crank case to further reduce the size of a power unit.

In order to achieve the above object, the present disclosure includes a first feature of a crank case structure adapted to a crank case (9) that houses a crankshaft (C) of a power unit (P), including: a crank case cover (20) attached to a side surface of the crank case (9); a push rod (31) that is disposed parallel to the crankshaft (C) and reciprocates to disengage a clutch (CL); and a clutch drive unit (30) that reciprocates the push rod (31) in which a through hole (32), through which the push rod (31) passes, is formed within an area of a sealing surface (29), the sealing surface (29) is formed in the crank case (9) to attach to the crank case cover (20), and the clutch drive unit (30) is attached to the crank case cover (20).

The present disclosure also includes a second feature of a drive sprocket (22), around which a drive chain (13) winds, being disposed rearward of the clutch drive unit (30), and the clutch drive unit (30) and the drive sprocket (22) partially overlapping each other in a side view of the crank case (9)

The present disclosure also includes a third feature of further including a chain cover (50) that is partially attached to a rear portion of the crank case cover (20) and partially covers the drive chain (13), in which a harness (40) is routed between the clutch drive unit (30) and the chain cover (50) and in which the harness (40) is accommodated in a groove (51) provided in the chain cover (50).

The present disclosure also includes a fourth feature of the crank case cover (20) and the chain cover (50) partially overlapping each other in a side view of the crank case (9).

The present disclosure also includes a fifth feature of a protective plate (60) being disposed between the crank case cover (20) and the drive sprocket (22).

According to the first feature, a crank case structure adapted to a crank case (9) that houses a crankshaft (C) of a power unit (P), includes: a crank case cover (20) attached to a side surface of the crank case (9); a push rod (31) that is disposed parallel to the crankshaft (C) and reciprocates to disengage a clutch (CL); and a clutch drive unit (30) that reciprocates the push rod (31) in which a through hole (32), through which the push rod (31) passes, is formed within an area of a sealing surface (29), the sealing surface (29) is formed in the crank case (9) to attach to the crank case cover (20), and the clutch drive unit (30) is attached to the crank case cover (20). Thus, it is possible to attach the clutch drive unit on the crank case cover and attach the clutch drive unit at a position that is further forward compared to a conventional configuration in which the clutch drive unit is attached directly on the crank case. Accordingly, the front-rear dimension of the crank case can be made smaller.

According to the second feature, the drive sprocket (22), around which a drive chain (13) winds, is disposed rearward of the clutch drive unit (30), and the clutch drive unit (30) and the drive sprocket (22) partially overlap each other in a side view of the crank case (9). Thus, it is possible to make the front-rear dimension of the crank case smaller.

According to the third feature, the crank case structure includes a chain cover (50) that is partially attached to a rear portion of the crank case cover (20) and partially covers the drive chain (13), a harness (40) is routed between the clutch drive unit (30) and the chain cover (50), and the harness (40) is accommodated in a groove (51) provided in the chain cover (50). Thus, the harness 40 can be protected from an external force or the like, and it is difficult to visually recognize the harness from an outer side, which can enhance an appearance of the harness.

According to the fourth feature, the crank case cover (20) and the chain cover (50) partially overlap each other in a side view of the crank case (9). Thus, it is possible to further make the front-rear dimension of the crank case smaller.

According to the fifth feature, the protective plate (60) is disposed between the crank case cover (20) and the drive sprocket (22). Thus, it is possible to protect the crank case and the crank case cover from stones or the like taken in by the drive chain.

DETAILED DESCRIPTION OF THE INVENTION

Figure 1:
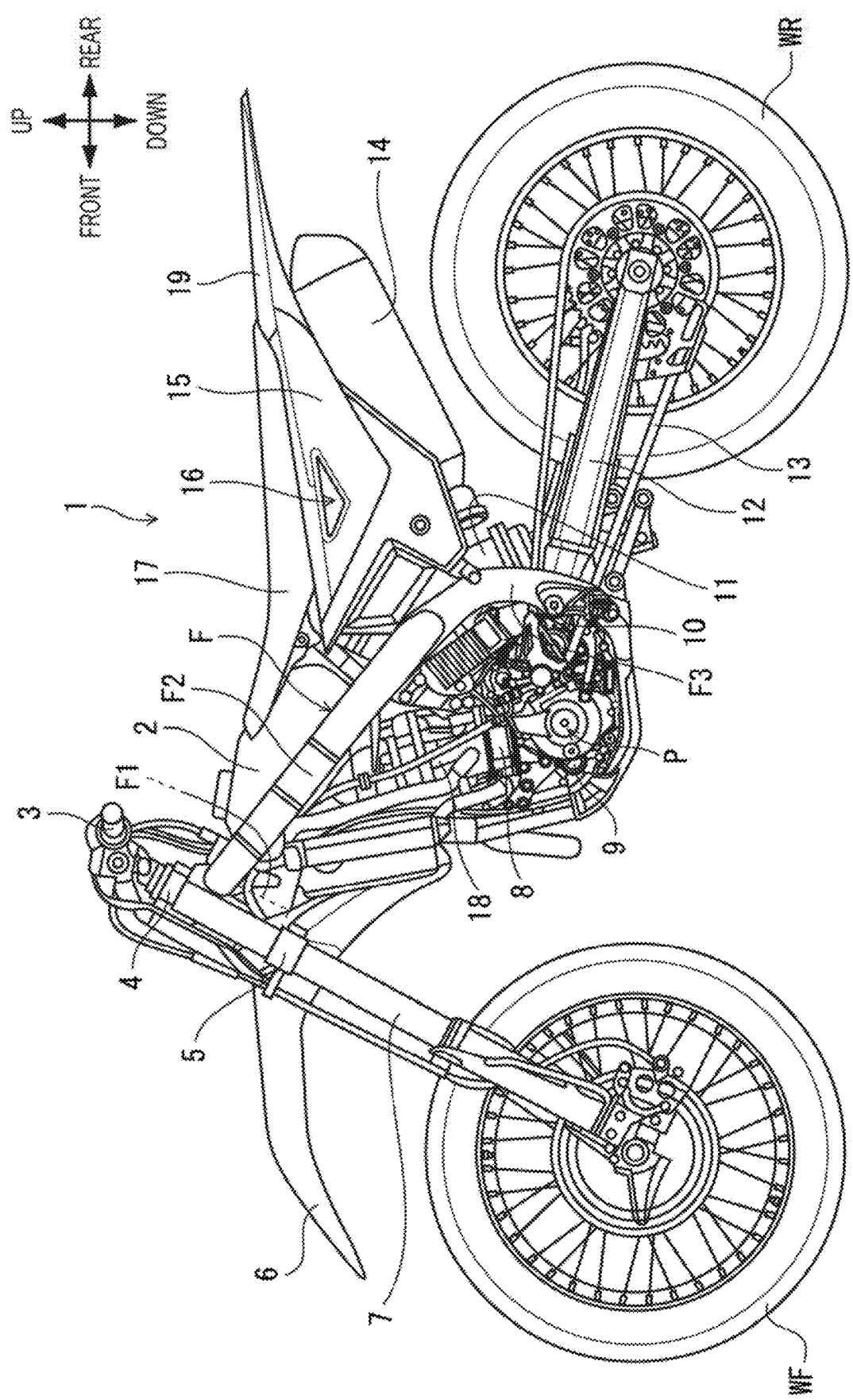
FIG. 1 is a left side view of a motorcycle according to a preferred embodiment of the present disclosure.

The following describes preferred embodiments of the present disclosure in detail with reference to the accompanying drawings. FIG. 1 is a left side view of a motorcycle 1 according to a preferred embodiment of the present disclosure. The motorcycle 1 is an off-road type saddled vehicle that transmits power from a power unit P, in which an engine and a transmission are integrated, to a rear wheel WR via a drive chain 13.

A head pipe F1 that rotatably supports a steering stem shaft (not shown) is attached to front end portions of a pair of left and right main frames F2 that constitute a vehicle body frame F. A top bridge 4 is fastened to an upper-end portion of the steering stem shaft, and a bottom bridge 5 is fastened to a lower-end portion of the steering stem shaft. A front wheel WF is rotatably supported by lower-end portions of a pair of left and right front forks 7 that are supported by the top bridge 4 and the bottom bridge 5. A steering handlebar 3 is attached to an upper portion of the top bridge 4, and a front fender 6 positioned above the front wheel WF is attached to the front fork 7.

A pair of left and right pivot frames F3 are connected to a lower-rear portion of the main frame F2. The pivot frames F3 support a pivot 10 that supports a swing arm 12 so as to be vertically swingable. The rear wheel WR is rotatably supported at a rear end portion of the swing arm 12. The swing arm 12 is suspended from the main frame F2 by a rear cushion 11 via a link mechanism.

The power unit P is suspended below the main frame F2 and in front of the pivot 10. A cylinder block 8 that slidably houses a piston and a cylinder head 18 that houses a valve mechanism are attached to an upper portion of a crank case 9 that houses a crankshaft C of the power unit P. The power unit P discharges combustion gas rearward from the diaphragm 14 at the rear of the vehicle body.

A fuel tank 2 is disposed on an upper portion of the main frame F2, and a seat 17 is disposed rearward of the fuel tank 2. A pair of left and right side covers 15 is disposed below the seat 17, and a rear fender 19 is disposed rearward of the side covers 15. An opening 16 that introduces outside air into an air cleaner box (not shown) is provided on the side cover 15 on a left side in a vehicle width direction.

Figure 2:
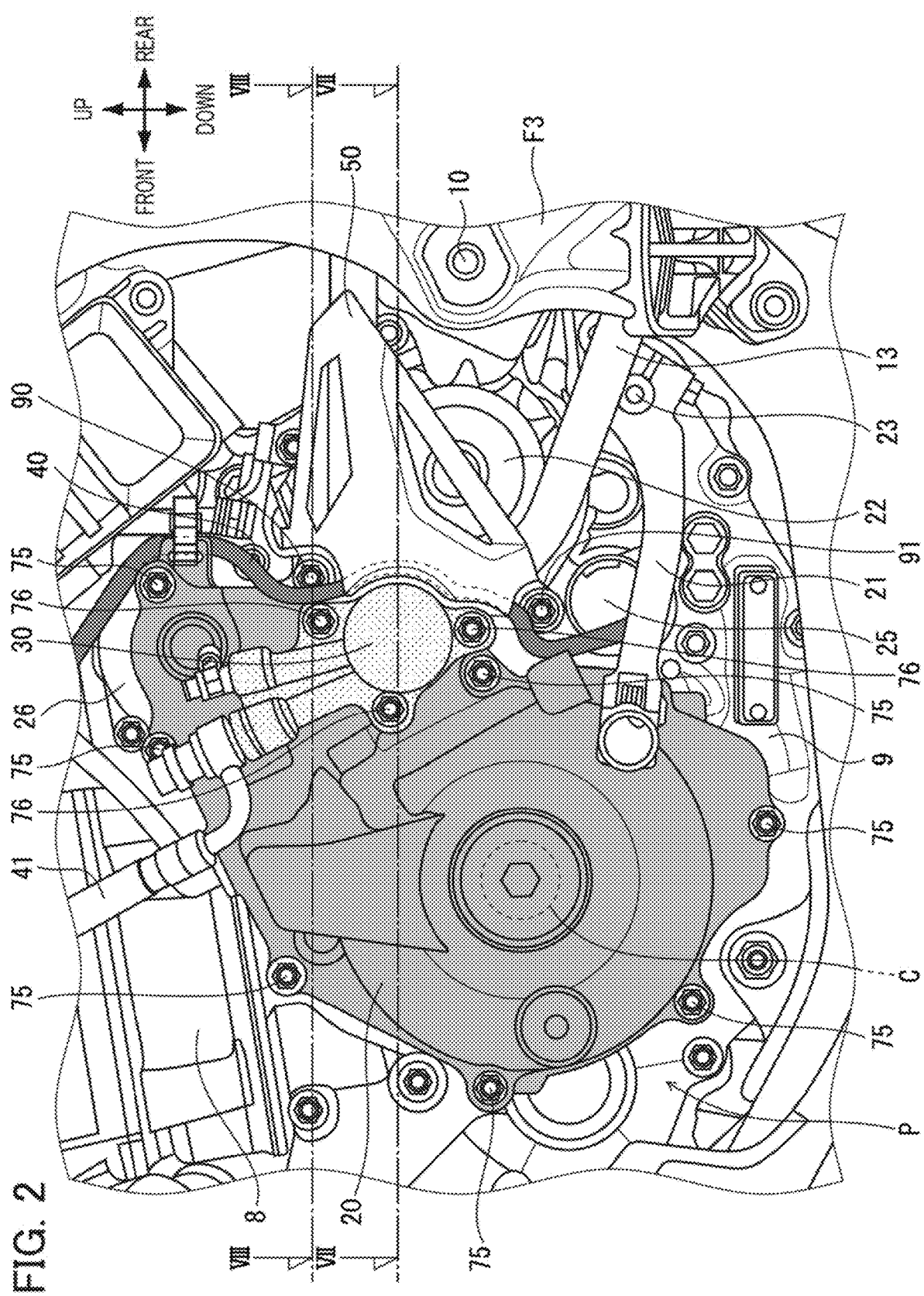
FIG. 2 is a partially enlarged left side view of FIG. 1.
Figure 3:
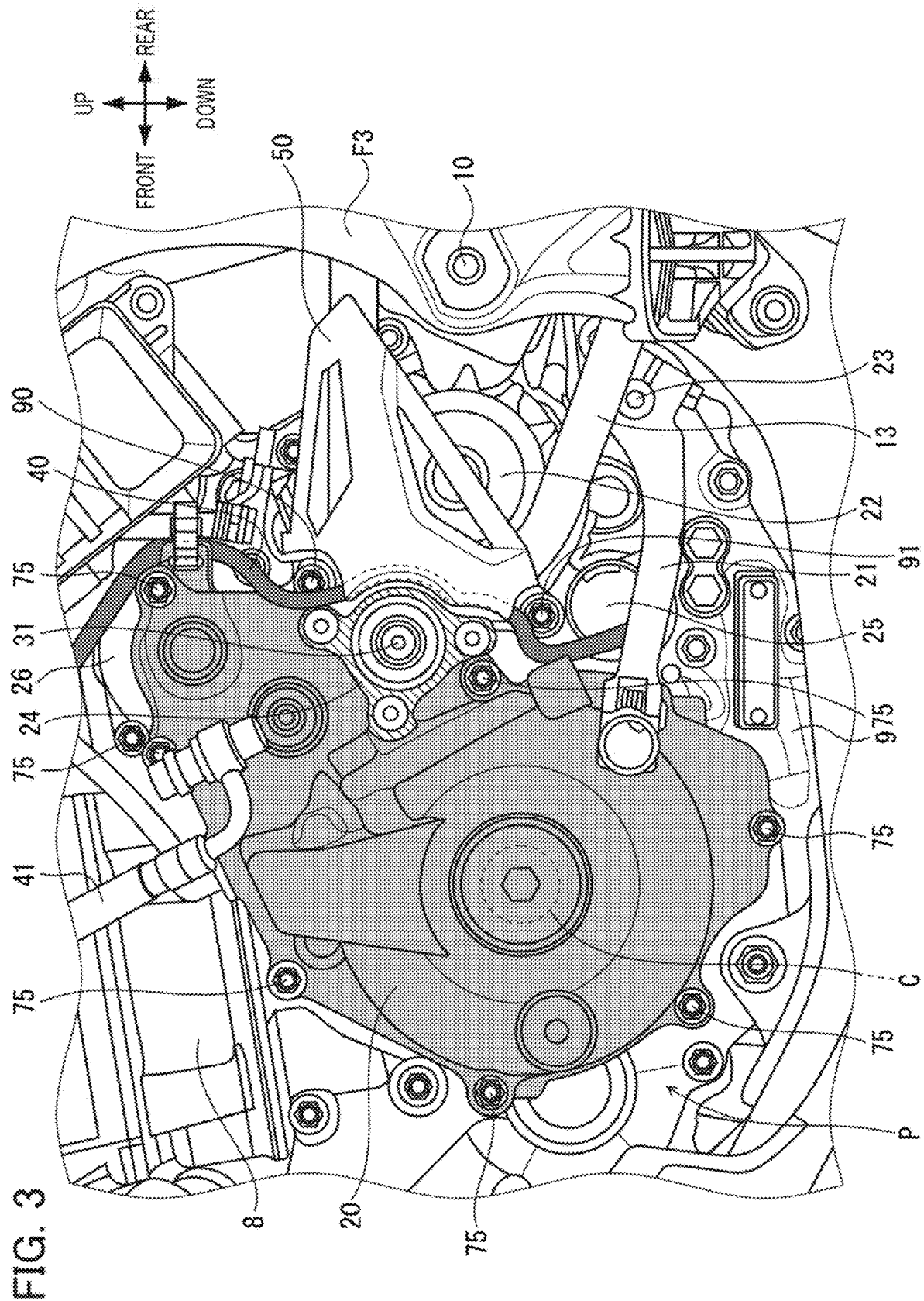
FIG. 3 is a partially enlarged left side view of FIG. 1 with a clutch drive unit removed.

FIG. 2 is a partially enlarged left side view of FIG. 1. FIG. 3 is a partially enlarged left side view of FIG. 1 with a clutch drive unit 30 removed. A crank case cover 20 (gray colored portion in the drawings) that covers a generator and the like disposed coaxially with the crankshaft C is attached to the side surface on the left side in the vehicle width direction of the crank case 9 that is made of a metal such as aluminum. The crank case cover 20 that is made of a metal such as aluminum or synthetic resin is attached to the crank case 9 by multiple bolts 75.

The clutch drive unit 30 (a dotted hatched portion in the figure) that drives a clutch that disengages power transmitted from the crankshaft C to a transmission is attached to the crank case cover 20. The clutch drive unit 30 that is hydraulic is attached, by three bolts 76, to a joining surface 24 formed on the left side surface of the crank case cover 20.

The clutch drive unit 30 drives the clutch by reciprocating a push rod 31 in the vehicle width direction in response to an operation of a clutch lever (not shown) that is attached to the steering handlebar 3. A clutch hose 41 that supplies a hydraulic pressure that is generated in response to the operation of the clutch lever is connected to an upper portion of the clutch drive unit 30. A cell motor 26 that starts the power unit P is attached to the upper-end portion of the crank case 9.

A chain cover 50 that covers a part of a drive sprocket 22, around which a drive chain (13) winds, is disposed behind the crank case cover 20. An upper bolt 90 that fastens an upper portion of a front end of the chain cover 50 is screwed to the crank case cover 20, and a lower bolt 91 that fastens a lower portion of the front end of the chain cover 50 is screwed to the crank case 9.

A gear position sensor 25 that detects a gear stage of the transmission is disposed below the chain cover 50. A harness 40 that outputs a sensor signal of the gear position sensor 25 is routed to pass between the crank case cover 20 and the chain cover 50 and extend upward. A shift spindle 23 that supports a shift pedal 21 that a rider operates with a left foot is disposed rearward of the gear position sensor 25. The shift spindle 23 rotates in response to an operation of the shift pedal 21, thereby changing the gear stage of the transmission.

Figure 4:
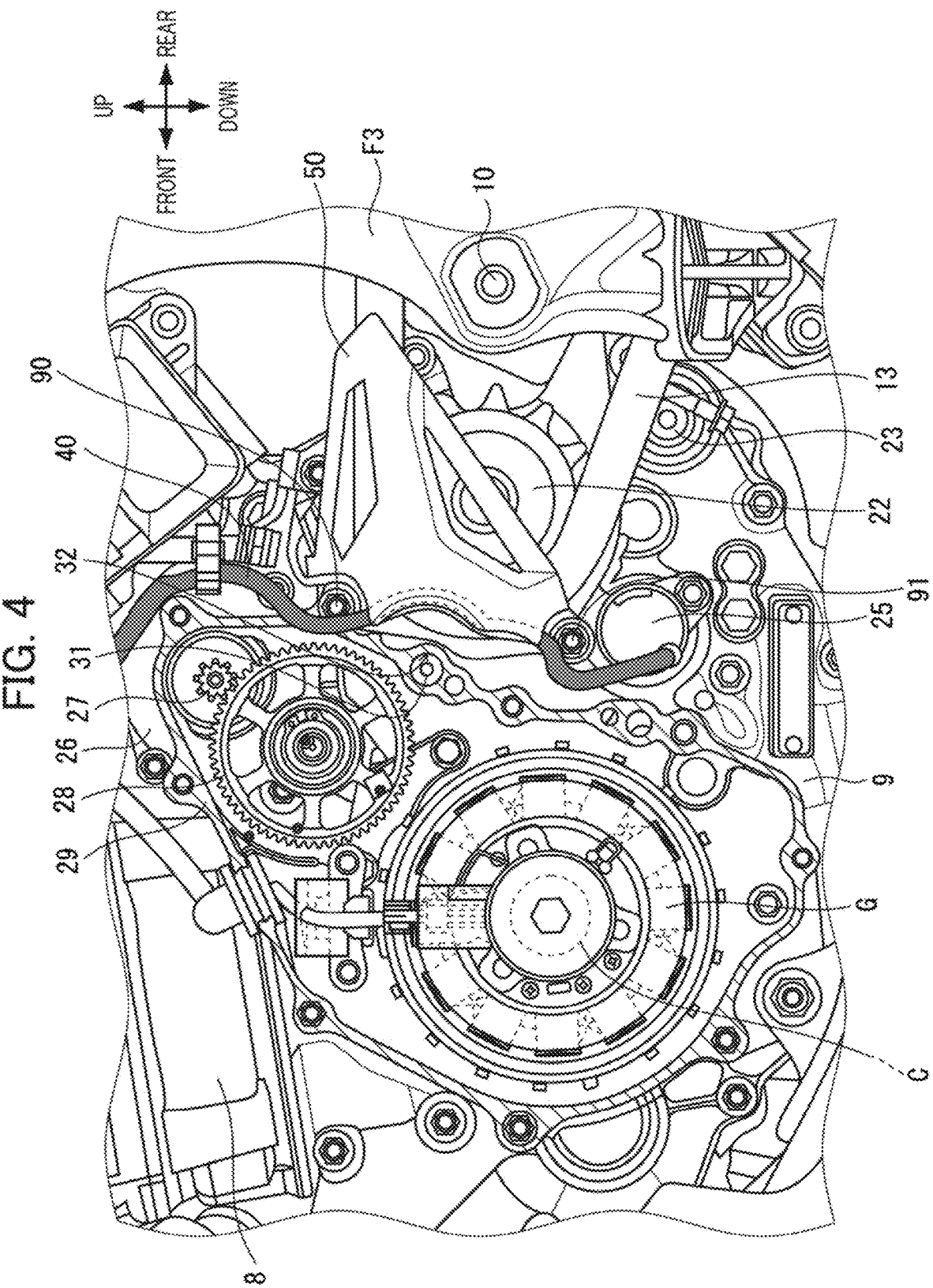
FIG. 4 is a left side view of a crank case with a crank case cover removed.

FIG. 4 is a left side view of the crank case 9 with the crank case cover 20 removed. A sealing surface 29 for attaching to the crank case cover 20 is formed on the left side surface of the crank case 9. A generator G, a drive gear 27 that is fastened to an output shaft of the cell motor 26, and a large diameter driven gear 28 that is engaged with the drive gear 27 are disposed inside the sealing surface 29.

A preferred embodiment of the present disclosure includes features of the through hole 32, through which the push rod 31 passes, being formed within an area of the sealing surface 29, the crank case cover 20 being attached to the sealing surface 29, and the clutch drive unit 30 being attached to the crank case cover 20. Accordingly, it is possible to attach the clutch drive unit 30 at a position that is further forward compared to a conventional configuration in which the clutch drive unit 30 is attached directly on the crank case 9. As a result, a front-rear dimension of the crank case 9 can be made smaller to reduce the size of the power unit P.

Further, due to a part of the chain cover 50 being attached to the rear end portion of the crank case cover 20, the crank case cover 20 and the chain cover 50 partially overlap with each other in a side view of the crank case 9. Thus, it is possible to further reduce the front-rear dimension of the crank case 9.

Figure 5:
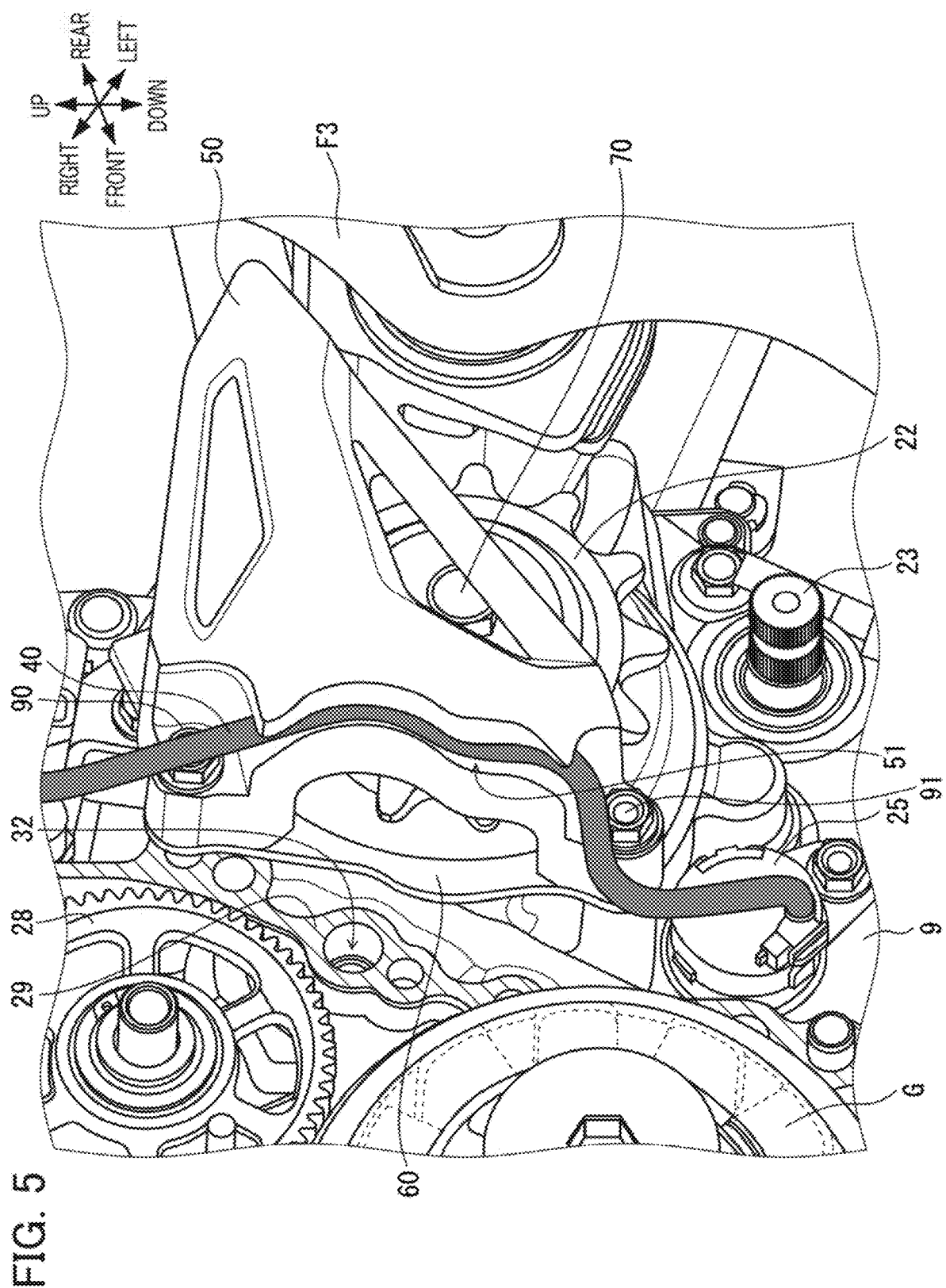
FIG. 5 is a perspective view illustrating an attaching structure of a chain cover.
Figure 6:
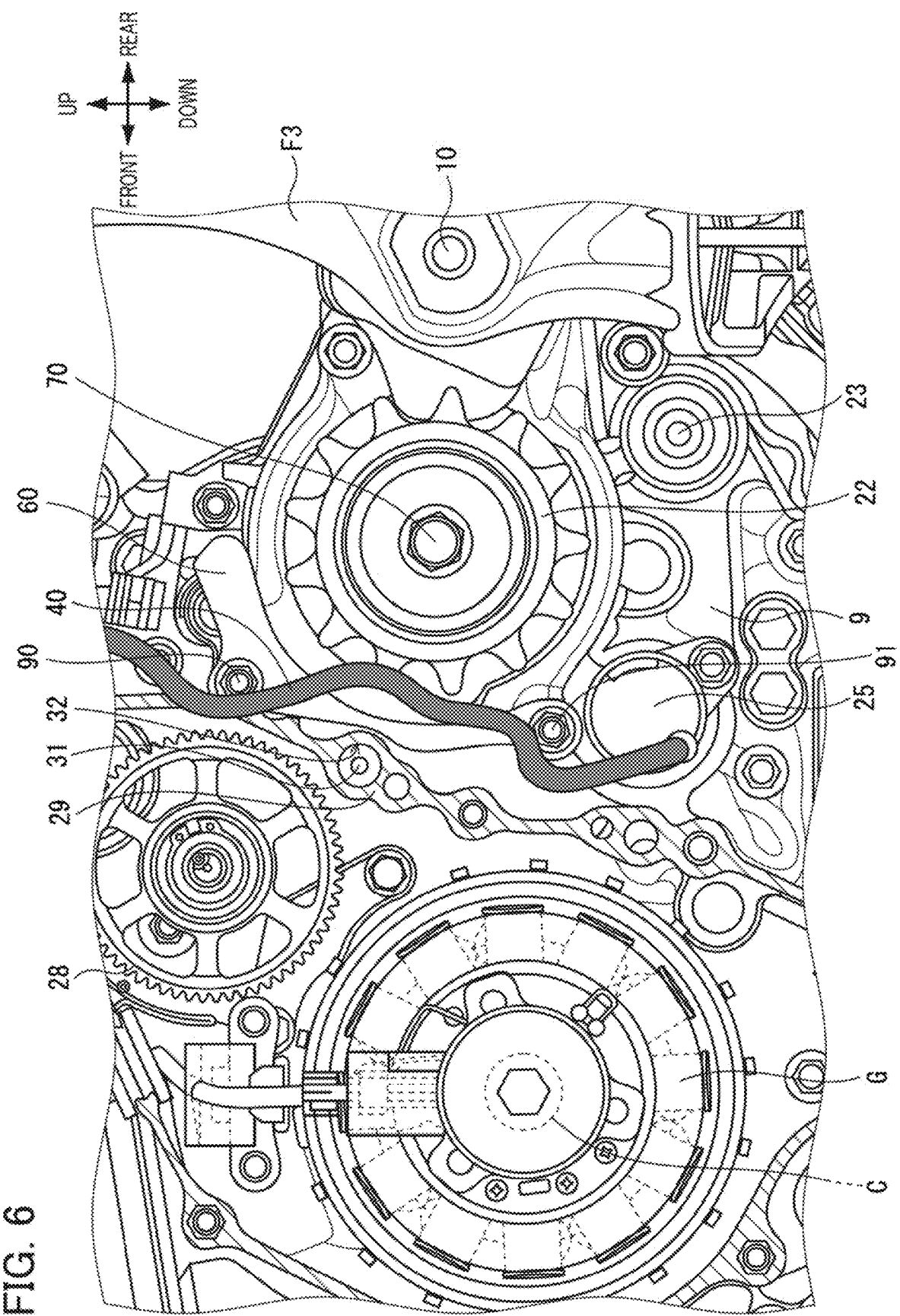
FIG. 6 is a left side view of a crank case 9 with the chain cover removed.

FIG. 5 is a perspective view illustrating an attaching structure of a chain cover 50. Also, FIG. 6 is a left side view of a crank case 9 with the chain cover 50 removed. The drive sprocket 22 is fastened to a countershaft 70 that serves as the output shaft that protrudes from the left side surface of the crank case 9. As described above, the through hole 32, through which the push rod 31 is inserted, is disposed within the area of the sealing surface 29 for attaching to the crank case cover 20.

The upper portion of the front end of the chain cover 50 and a protective plate 60 that is positioned forward of the drive sprocket 22 are fastened together to the crank case cover 20 by the upper bolt 90. In contrast, the lower portion of the front end of the chain cover 50 is fastened to the protection plate 60 by the lower bolt 91. The protection plate 60 is formed of a vertically long plate-like member that is curved to cover a front of the drive sprocket 22.

The harness 40 is routed between the clutch drive unit 30 and the chain cover 50. A groove 51 for accommodating the harness 40 is formed in the front portion of the chain cover 50. By routing and accommodating the harness 40 in the groove 51, the harness 40 can be protected from an external force or the like, and it is difficult to visually recognize the harness from an outer side, which can enhance an appearance of the harness.

Figure 7:
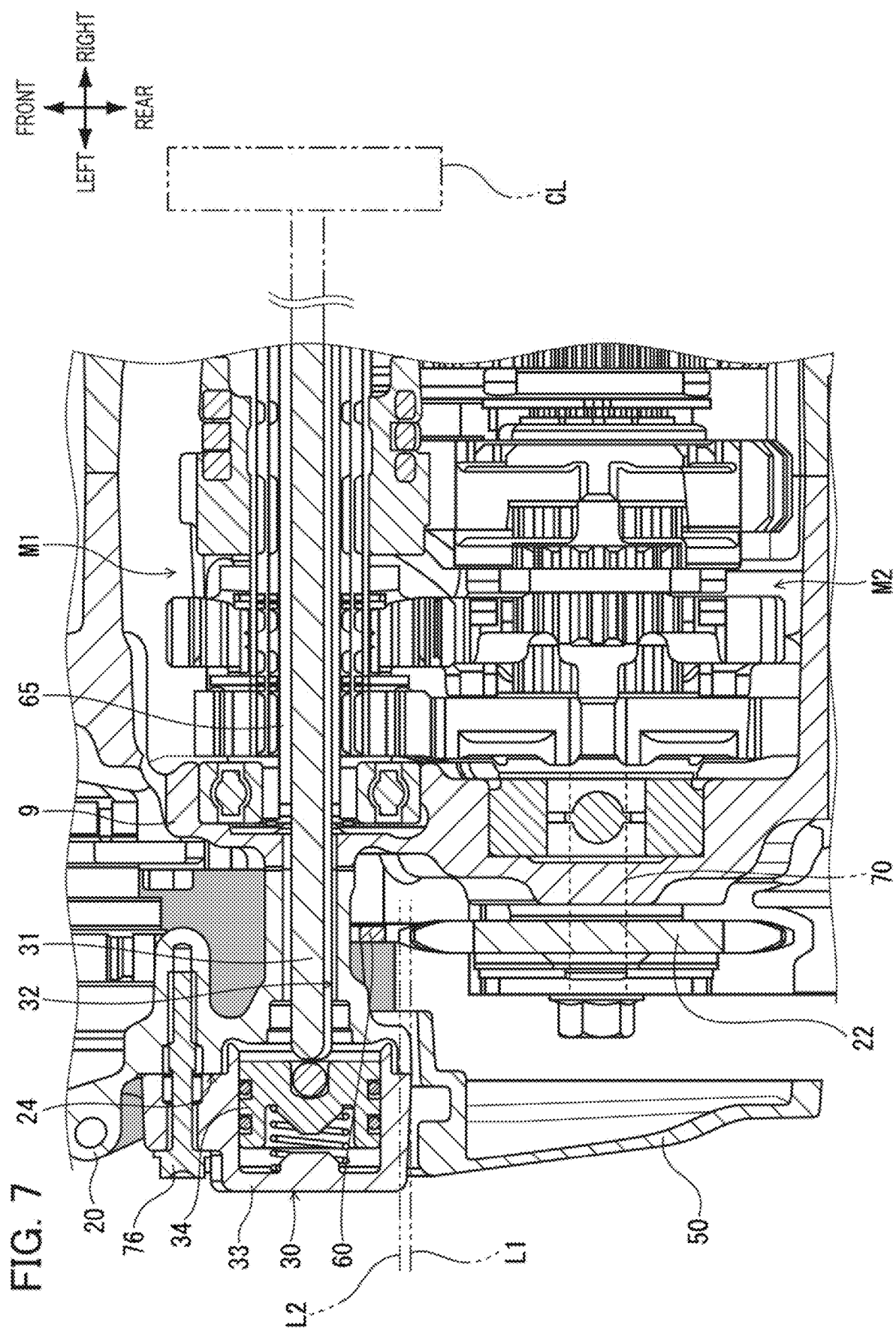
FIG. 7 is a cross-sectional view taken along the line VII-VII of FIG. 2.
Figure 8:
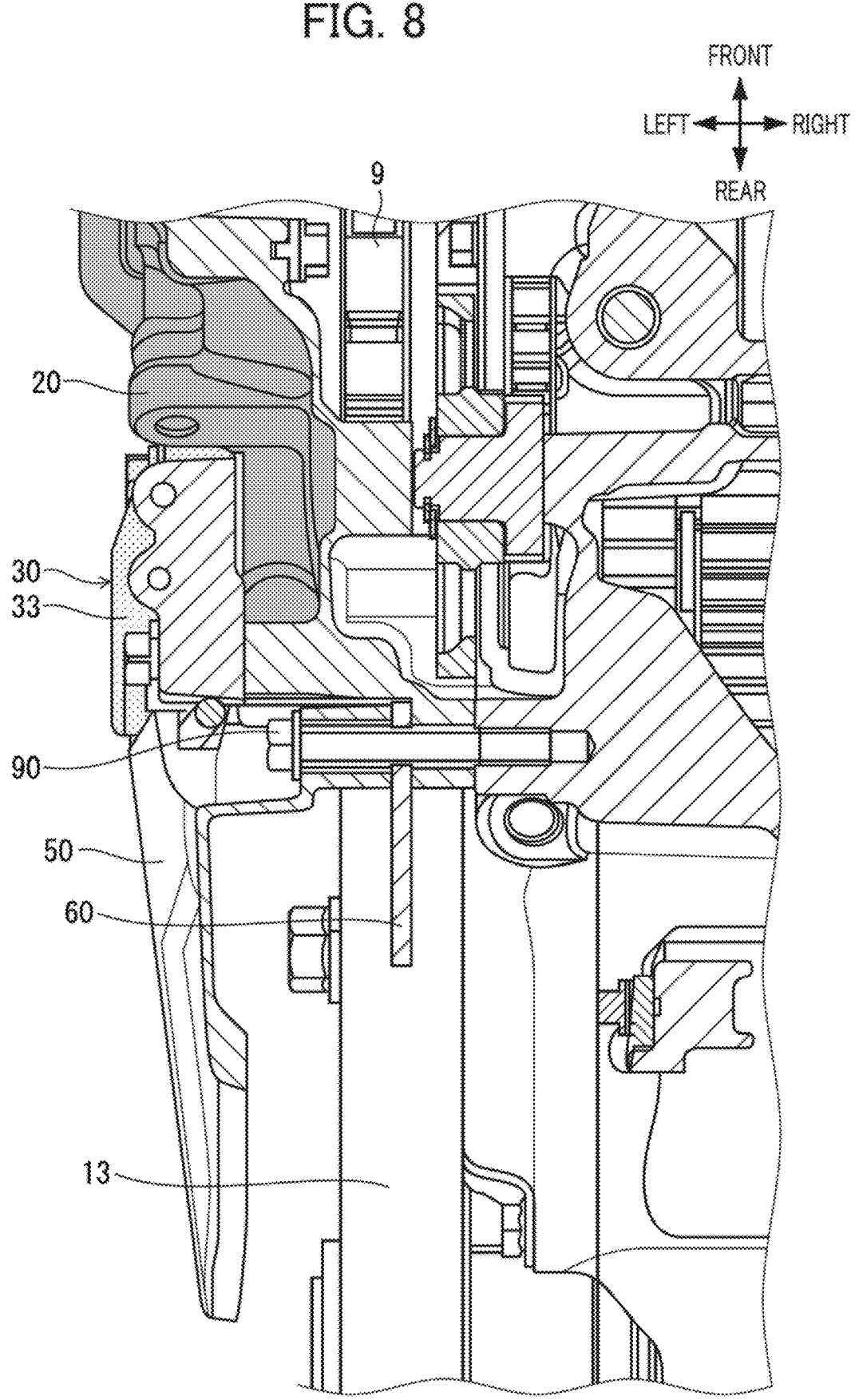
FIG. 8 is a cross-sectional view taken along the line VIII-VIII of FIG. 2.

FIG. 7 is a cross-sectional view taken along the line VII-VII of FIG. 2. FIG. 8 is a cross-sectional view taken along the line VIII-VIII of FIG. 2. The transmission of the power unit P includes a drive-side gear train M1 and a drive-side gear train M2. The drive-side gear train M1 is supported by a main shaft 65 that rotates by the power of the crankshaft C, and the drive-side gear train M2 is supported by a counter shaft 70. The push rod 31 that disengages the clutch CL that is disposed on a right side in the vehicle width direction of the crank case 9 is disposed so as to penetrate the main shaft 65.

The clutch drive unit 30 according to the preferred embodiment of the present disclosure includes a configuration in which a hydraulic piston 34 for pressing the push rod 31 is accommodated in a casing 33 that is formed of a metal such as aluminum. A rear end portion L1 of the casing 33 is positioned rearward of a front end portion L2 of the drive sprocket 22, and the clutch drive unit 30 and the drive sprocket 22 partially overlap each other in a side view of the crank case 9. Accordingly, it is possible to reduce the front-rear dimension of the crank case 9.

The protection plate 60 that is positioned rearward of the crank case cover 20 and forward of the drive sprocket 22 includes a function of protecting the crank case 9 and the crank case cover 20 from stones or the like taken in by the drive chain 13.

Figure 9:
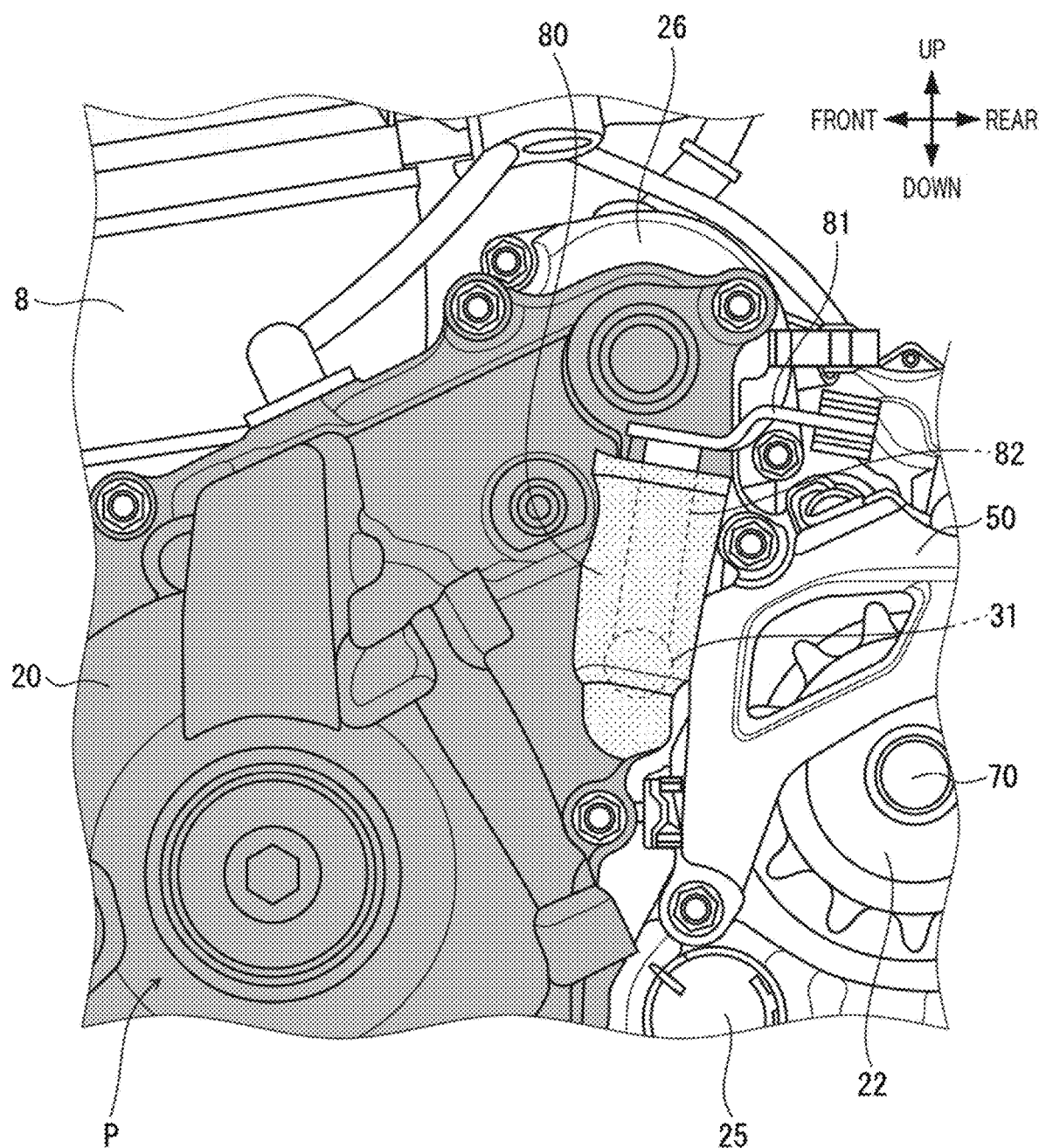
FIG. 9 is a partially enlarged left side view of a power unit according to a modified case of the present invention.

FIG. 9 is a partially enlarged left side view of the power unit P according to a modified case of the present invention. Parts with the same reference numerals as those described above denote parts that are the same or equivalent. Instead of the clutch drive unit 30 that is hydraulic, a clutch drive unit 80 that is mechanical can be attached to a side surface of the crank case 9. The clutch drive unit 80 is configured to rotate the drive shaft 82 to push the push rod 31 by retracting a clutch cable (not shown) to rotate a rocker arm 81. In the crank case structure according to the present disclosure, because the clutch drive unit is attached to the crank case cover, it is also easy to replace the clutch drive unit.

A configuration of the motorcycle, a configuration of the power unit, a structure of the clutch, a shape and a structure of the crank case and the crank case cover, a shape and a structure of the clutch drive unit, a shape and a disposition of the push rod, a shape of the seal surface, a shape of the protective plate, and the like are not limited to the above-described embodiment, and various modifications are possible. For example, the crank case cover and the clutch drive unit may be attached to a side surface on the right side in the vehicle width direction of the crank case. The crank case structure according to the present invention can be applied to various vehicles having a crank case.

EXPLANATION OF REFERENCE NUMERALS 1 motorcycle, 9 crank case, 13 drive chain, 20 crank case cover, 22 drive sprockets, 29 sealing surface, 30 clutch drive unit, 31 push rods, 32 through holes, 40 harness, 50 chain cover, 51 grooves, 60 protection plate, P power unit, C crankshaft, CL clutch

What is claimed is:

1. A crank case structure adapted to a crank case that houses a crankshaft of a power unit, comprising:
   a crank case cover attached to a side surface of the crank case;
   a push rod that is disposed parallel to the crankshaft and reciprocates to disengage a clutch, and
   a clutch drive unit that reciprocates the push rod, wherein
   a through hole, through which the push rod passes, is formed within an area of a sealing surface, the sealing surface is formed at a peripheral border and interface between the crank case and the crank case cover, and the clutch drive unit is attached to the crank case cover.

2. The crank case structure according to claim 1, wherein a drive sprocket, around which a drive chain winds, is disposed rearward of the clutch drive unit, and
   the clutch drive unit and the drive sprocket partially overlap each other in a side View of the crank case.

3. The crank case structure according to claim 2, further comprising a chain cover that is partially attached to a rear portion of the crank case cover and partially covers the drive chain, wherein
   a harness is routed between the clutch drive unit and the chain cover, and
   the harness is accommodated in a groove provided in the chain cover.

4. The crank case structure according to claim 3, wherein the crank case cover and the chain cover partially overlap each other in a side view of the crank case.

5. The crank case structure according to claim 4, wherein a protective plate is disposed between the crank case cover and the drive sprocket.

* * * * *